United States Patent [19]

Roberts

[11] 4,034,115

[45] July 5, 1977

[54] MULTI-CURDLED MILK PRODUCT AND THE PROCESS FOR THE PREPARATION THEREOF

[76] Inventor: James Gordon Roberts, 161 Flamingo Drive, Clearwater, Fla. 33516

[22] Filed: July 29, 1975

[21] Appl. No.: 599,959

[52] U.S. Cl. .................................................. 426/43
[51] Int. Cl.² .......................................... A23C 9/12
[58] Field of Search ................ 426/43, 42; 195/111

[56] References Cited
UNITED STATES PATENTS

| | | |
|---|---|---|
| 2,824,804 | 2/1958 | Mishima .............................. 426/43 |
| 2,936,237 | 5/1960 | Schmidt-Burbach ................ 426/43 |
| 3,563,760 | 2/1971 | Kuwabara et al. .................. 426/43 |

Primary Examiner—Lionel M. Shapiro
Attorney, Agent, or Firm—Pennie & Edmonds

[57] ABSTRACT

This invention relates to a milk product produced by a process that breaks down the disaccharide sugar present in milk more effectively by an unhindered multi-curdling process while enriching the milk product with nutritional and therapeutic advantages by superimposing cultures of *Lactobacillus bulgaricus*, *acidophilus*, *bifidus*, and *colostrum* to produce a new palatable and tasteful milk product which will be symbiotic with the human body.

7 Claims, No Drawings

MULTI-CURDLED MILK PRODUCT AND THE PROCESS FOR THE PREPARATION THEREOF

BACKGROUND OF THE INVENTION

This invention relates to food products and a process for their preparation to produce a multi-curdled milk product with an acceptable and palatable flavor. More specifically, this invention relates to a unique multi-curdled milk product that employs a process that reduces the disaccharide sugar or lactose more completely than heretofore thought possible thereby increasing the amount of glucose and galactose. Prior milk products that have been prepared by multiple fermentation have used either alcohol or heat during the preparation which have the effect of hindering the enzymatic transformation of lactose to glucose and galactose. The use of alcohol in a milk product through some form of fermentation with yeast inhibits some of the enzymes normally present in milk and produces food of lessened nutritional content. Moreover, some people are allergic to the lactose in milk itself and are, therefore, denied the benefits of a milk product. For millions of people, intolerance develops during the life cycle such that they are unable to easily digest lactose, a condition that is believed to arise from the deficiency of B-galactosidase in the intestinal microville.

Previously, bacteria used as starters for culturing various types of milk base products have included spherical types such as *Streptococcus lactis, Streptococcus cremoris, Leuconostoc citrovorum, Streptococcus diacelelatics*, and *Streptococcus durans* which are used primarily for buttermilk and sour cream while rod-shaped types such as *Lactobacillus bulgaricus, Lactobacillus helveticus, Lactobacillus lactis, Lactobacillus acidophilus, Actinomyuces bifidus*, and *Doderlein's bacillus* are used primarily for yogurtlike products. However, such milk base products generally have a lactose content after one culturing still higher than it need be.

In previously developed processes, the lactose was broken down by various fermentation processes converting the lactose into lactic acid as when milk with or without non-fat milk solids, partly skim milk or skim milk is changed into yogurt or buttermilk; however, over 80 percent of the disaccharide sugar may remain unspent after the buttermilk and sour cream fermentation is completed. Further efforts to remove the lactose have resulted in the past in lowering the nutritional value of the milk product or producing products that are unpalatable.

It has also been incorrectly assumed that cultures must be balanced when used together. One culture will reach a peak at which curd starts to separate from the whey. At this point, the addition of different varieties of souring cultures will produce new curdling as though no souring had occurred when the product is brought to a temperature suitable for optimal growth. Here, temperature is the controlling factor. *L. bifidus* and *L. acidophilus*, however, will culture separately at the same temperature if introduced at different times, especially when the first culturing is cooled and blended.

An inexpensive process to produce milk products digestable to the multitude of persons who cannot drink it would have far-reaching effects, particularly if substantial quantities of lactose can be transformed without altering the nutritional value of the milk products, except to improve it.

The therapeutic value of inoculating milk with various strains of microorganisms has been reported by numerous authorities and this is particularly true for maintaining a good intestinal metabolism and health. Three species of such microorganism cultures include *L. bifidus, L. acidophilus*, and *L. bulgaricus. L. bulgaricus* is used in the production of yogurt and is believed to prolong human life by inhibiting the growth of proteolytic microbes in the intestinal tract; however, the culture will not survive in the digestive tract for prolonged periods of time. *L. acidophilus* and *L. bifidus*, on the other hand, are known to be able to retain their viability through the digestive tract, displacing proleolytic bacteria completely, thus affording a means of implantation in the lower intestinal tract. Both cultures have the faculties of maintaining a normal microbiological balance, particularly in the intestinal flora, suppressing many undesirable organisms while promoting a beneficial metabolism. *L. acidophilus* is completely non-pathogenic and offers an entirely safe, therapeutic regimen.

Until a few years ago, the beneficial effects resulting from the ingestion of *L. acidophilus* in cases of gastrointestinal disturbances were attributed to the simple outgrowth of the offending pathogen by the lactobacilli. Recently, a number of workers established that there is more to the reaction than just competition between strains. A by-product produced by *L. acidophilus* has been called variously antagonist (White and Hall, J. Dental Res. 48272, 1949); lactobacillin (Wheater et al., ATE Nature 168, 659, 1951); lactocidin (Vincent et al., J. Bact. 78, 479, 484, 1959); and antibiotic (Shahani et al., U.S. Pat. No. 3,689,640).

The form in which *L. acidophilus* has been usually employed to obtain its therapeutic effect has been as fermented milk. The number of viable organisms in acidophilus milk was usually in the order of 250 million per milliliter which produced a highly distasteful and for many a completely unpalatable product. In addition, the product had a relatively short useful life, usually limited to less than two weeks, which often created problems in distribution and handling. Moreover, the processing of such fermented milk as compared with ordinary milk was extremely expensive.

The beneficial effects of *L. bifidus* have also been recently reported (The Milk Industry, September, 1973). Here, it has been established that *L. bifidus* forms a substantial proportion of the intestinal flora of babies and performs an inhibiting effect on pathogenic bacteria and the growth of aerobic putrefactive microorganisms in the intestinal tract.

In efforts to improve the quality of my milk product, I have discovered that the milk initially secreted during the first few days after parturition, more commonly known as colostrum, can also be combined and made into a palatable milk product. Colostrum is known to contain high protein content which when added to milk provides a highly nutritional product without the need for nay condensation. However, the possible benefits that could be gained from colostrum have been largely ignored because of its bitter taste.

Various processes that have been developed to prepare a multi-cultured milk product of this type have involved using yeast or alcohol which must necessarily interfere with the antibiotic effect of the bacteria since alcohol destroys bacteria. Various yogurt type products, as distinguished from ordinary dairy yogurt, have been produced by either a mixing together of separate fermented products such as in U.S. Pat. No. 1,899,817 (Matt) issuing on February 28, 1933; high heat treatment as in U.S. Pat. No. 2,119,599 (Nordsiek) issuing on June 7, 1938; or alcoholic fermentation as in U.S. Pat. No. 2,824,804 (Mishima) issuing on Feb. 25, 1958. None of these processes, however, produce a palatable product and attempts to improve the flavor have not been satisfactory. The addition of flavors and sugar, particularly fresh fruits and berries, to the mixes undergoing the incubation stage has met with disflavor in that the incubation conditions have caused loss of flavor and color in the flavoring additives. Moreover, because the digestion of fruits and milk involve different enzymes and different digestive processes, such mixing may involve enzymatic and other conflicts ruining any such mixture as a health food. Milk should be consumed alone and not mixed with other foods. Other processing attempts have resulted in poorly controlled growth conditions which yield inferior quality taste, poor shelf life, as well as substantially altering the nutritional value of the milk product.

It is the purpose of this invention to provide a new nutritional and therapeutic milk product made by a multi-curdling process that will significantly reduce the unspent lactose after a buttermilk or sour cream type fermentation is completed or even yogurt fermentation and produce a product that is tasteful and can be digested by persons having an intolerance for lactose besides being more easily digested by anyone.

Another purpose of this invention is to improve upon the nutritional and therapeutic value of a milk product when transforming the lactose content by using various ingredients that individually are unpalatable but when combined in this invention produce an inexpensive tasteful milk product.

It is still another object of this invention to provide a food product with better flavor, consistency, and palatability than previously obtained when culturing a milk product with *L. acidophilus* or *L. bifidus* microorganisms.

In addition, the ingredients used in this invention not only produce a more desirable milk food product but provide for an inexpensive process that transforms the percentage of lactose into glucose and galactose by an amount heretofore thought impossible, thereby providing a food product that is more easily digestable by anyone and particularly by the multitude of people who cannot normally drink milk.

Other objects of the invention will be apparent from the following discussion and description of this invention.

DESCRIPTION OF THE INVENTION

This invention comprises a buttermilk-like or yogurt-like food product high in nutritional and therapeutic value but low in lactose content. According to the instant invention, ordinary milk, cream, or skim milk is raised to a temperature suitable for the culturing process and inoculated with lactic acid forming bacteria cultures used in ordinary commercial buttermilk, such as *Streptococcus lactis*, *Streptococcus cremoris*, *Streptococcus diacetilactis*, and *Leuconostoc citrovorum*. Typically, the mixture is allowed to ferment at approximately 70° F. The curdling is allowed to continue until the lactose is hydrolyzed as fully as possible into glucose and galactose. While this forms a product similar to ordinary buttermilk, approximately 80 percent of the lactose remains. The mixture may then be inoculated a second time with an *L. bulgaricus* strain of bacteria and *Streptococcus thermophilus* and allowed to ferment at 105° F to 114° F. The second curdling further reduces the lactose and the fermentation is allowed to continue until curd starts to separate from the whey, at which point both flavor and texture change. Upon cooling, small amounts of colostrum derived from cow's milk is then added and the resulting mixture thoroughly agitated. It has been found that for every 100 parts of milk, up to 10 parts of colostrum may be added without unreasonable changes in flavor. If desired, the mixture can be aged for about 24 hours without affecting the nutritional value while further improving the palatability of the mixture as the bitter taste associated with colostrum is largely eliminated. Attempts to add colostrum at a later stage of the process have shown that its unpleasant flavor cannot be readily masked. The combination described therein offers a means of masking such flavor. The mixture is then inoculated a third time by using *L. acidophilus* or *L. bifidus* strains of bacteria and the mixture allowed to ferment at approximately 98° F. Typically, the preferred acidophilus bacteria agent is a commercial culture marketed under the designation of Fargo 405, although other well-known cultures may be used. The fermentation process as before is allowed to be completed in order to transform the lactose content of the mixture as fully as possible and producing a mixture with the therapeutic advantages of the acidophilus antibiotic. The multiple curdling significantly transforms the amount of lactose while increasing the amount of lactase to produce as much of the enzyme as may be produced through multiple curdling without processing interference. While this last inoculation with *L. acidophilus* affects the lactobacillus that soured the milk initially, it does not overwhelm the flavor that has been previously imparted to the buttermilk. Alternatively, *L. bifidus*, which can be purchased commercially as Eugalan Forte, can also be used to effect the second or third curdling or can be used to inoculate the mixture for a fourth curdling process. The final culturing should involve symbiotic bacteria that will survive the human body temperature. It is important that no alcohol or heat treatment occurs which would reduce the amount of lactase being developed during the third and fourth curdling operations. The resulting product is then agitated to provide a smooth consistency to the multi-curdled milk product. The product has been found to have a pleasing, palatable taste similar to buttermilk but with enhanced nutritional and therapeutic characteristics.

At various points during the process, suitable flavoring and food enrichment material such as potassium salts and vitamin ingredients can be added. The flavor of the end product of this invention is sufficiently palatable that it need not be disguised with alcohol, fruit juices, or sugar, although such additives may be added at the completion of the several fermentation processes.

An important feature of this invention is that a milk product with a good flavor can be produced through a multi-curdling process to provide a highly nutritional food with a low lactose content with bacteria which will survive within the digestive tract. The presence of *L. acidophilus* has the faculty of maintaining a normal microbial balance, suppressing many undesirable organisms and promoting a beneficial metabolism as there are no known harmful side effects associated with its presence. At the University of Nebraska in 1974 which further established that lactobacilli synthesizes an antitumor compound when used to culture milk.

When a commercial culture of *L. bulgaricus* and *Streptococcus thermophilus* bacteria is used, 1 percent of culture is the usual amount and a time for fermentaion of five to seven hours may be expected. If a finished product is used as a starter, the time required may be cut by one half or more. In the event *L. acidophilus* is used without a yogurt producing culture, approximately 10 parts of this culture is required as a starter with commercial buttermilk. Incubation should occur at body temperature with complete curdling occuring within three to five hours. The same requirements and time apply when the third culturing occurs with *L. bidifus*. While *L. bifidus* has been used to curdle the milk product after inoculating with L. acidophilus, it has been found that *L. bididus* may also be used before inoculating with *L. acidophilus*.

It should be understood that the foregoing disclosure relates to only a preferred embodiment of the invention and that numerous modifications or alterations may be made therein without departing from the spirit and the scope of the invention as set forth in the appended claims. The product described therein can also be started by inoculating raw, certified milk which would require no preheating before inoculation and results in a readily available safe, unpasteurized whole milk or skim milk product as that term is used by the U.S. Public Health Code.

What is claimed is:

1. A method of producing a multi-curdled food product which comprises:
   a. effecting a first fermentaion of milk, skim milk, or cream with a lactic type, acid-producing culture for a period of time sufficient to produce buttermilk;
   b. effecting a second fermentation of the product resulting from step (a) with a yogurt culture wherein said culture is selected from the group consisting of *Lactobacillus bulgaricus, Lactobacillus helveticus, Lactobacillus lactic,* and *Streptococcus thermophilus* between a temperature range of 105°-114° F. until the curds start to separate;
   c. adding small amounts of colostrum to the product resulting from step (b); and then
   d. effecting a third fermentation of the product resulting from step (c) with a lactobacillus culture wherein said culture is selected from the group consisting of *L. acidophilus* and *L. bifidus* at a temperature of approximately 98° F. for a period of time sufficient to produce a symbiotic product high in lactase content.

2. The method of claim 1 where for every 100 parts of mixture up to 10 parts of colostrum are added.

3. The method of claim 2 where the mixture is agitated and aged for up to twenty-four hours after the addition of colostrum.

4. The method of claim 1 where a fourth fermentation is effected with an *L. bifidus* culture.

5. The method of claim 1 where an acidophilus culture is used for the second fermentation and a bifidus culture is used to effect the third fermentation.

6. A multi-curdled food product produced by the method claimed in claim 5.

7. A method for producing a multi-curdled food product that avoids use of alcohol or sterilization heat for producing a tasteful milk product with increased therapeutic and nutritional value by multiple culturing of the same milk which comprises:
   a. effecting a first fermentation of milk, skim milk, or cream with a lactic type, acid-producing culture for a period of time sufficient to produce buttermilk;
   b. effecting a second fermentation of the product resulting from step (a) with a yogurt culture wherein said culture is selected from the group consisting of *Lactobacillus bulgaricus, Lactobacillus helveticus, Lactobacillus lactic,* and *Streptococcus thermophilus* between a temperature range of 105°-114° F. until the curds start to separate; and then
   c. effecting a third fermentation of the product resulting from step (b) with a Lactobacillus culture wherein said culture is selected from the group consisting of *L. acidophilus* and *L. bifidus* for a period of time sufficient to hydrolyze the remaining lactose as fully as possible.

* * * * *